United States Patent [19]

Nagy

[11] Patent Number: 5,588,613

[45] Date of Patent: Dec. 31, 1996

[54] FISH TAPE REEL ATTACHMENT APPARATUS USED IN COMBINATION WITH A FISH TAPE REEL

[76] Inventor: Peter Nagy, 24761 Nellie Gail Rd., Laguna Hills, Calif. 92653

[21] Appl. No.: 411,269

[22] Filed: Mar. 27, 1995

[51] Int. Cl.$^6$ .......................... B65H 57/12; B65H 75/40; H02G 1/08
[52] U.S. Cl. .................. 242/395; 242/397.1; 242/405.3; 254/134.3 FT
[58] Field of Search .................... 242/395, 395.1, 242/397.1, 405, 405.3; 254/134.3 FT

[56] References Cited

U.S. PATENT DOCUMENTS

| | | | |
|---|---|---|---|
| 455,275 | 11/1892 | Hanson | 242/405.3 |
| 1,076,870 | 10/1913 | Dahl | 254/134.3 FT |
| 1,118,270 | 11/1914 | Dahl | 254/134.3 FT |
| 1,443,004 | 1/1923 | Chatterton | 242/395 |
| 1,761,592 | 6/1930 | Seidel | 254/134.3 FT |
| 1,956,806 | 7/1933 | Mitzen et al. . | |
| 2,099,153 | 7/1936 | Walker . | |
| 2,268,178 | 12/1941 | Boisture | 242/405.3 |
| 2,803,413 | 7/1957 | Lyon . | |
| 3,072,382 | 1/1963 | Jones | 254/134.3 FT |
| 3,763,722 | 10/1973 | Ehrens . | |
| 3,844,058 | 10/1974 | King | 242/397.1 |
| 3,937,415 | 2/1976 | Prinz . | |
| 4,054,264 | 10/1977 | Elversson | 254/134.3 FT |
| 4,251,038 | 2/1981 | Gename . | |
| 4,413,808 | 11/1983 | Finkle . | |

FOREIGN PATENT DOCUMENTS 222201  8/1968  Sweden .

Primary Examiner—John M. Jillions
Attorney, Agent, or Firm—Thomas I. Rozsa; Tony D. Chen

[57] ABSTRACT

A manually powered fish tape reel attachment apparatus which is used in combination with a conventional fish tape reel for pulling electrically insulted wires through a conduit. The apparatus comprises a frame member with a fixed handle at one end and a tubular member at the other end. An internal hub member is mounted in the middle of the frame member such that the fish tape reel will be fitted thereon and will be rotated by the internal hub member. The fish tape itself is fed through the tubular member. The frame member has a ratchet mechanism which is a ratchet type device attached to a gear mechanism which is attached to the internal hub around which the fish tape reel fits. The ratchet mechanism can be rotated and due to the ratcheting effect of the ratchet, can create excess pressure and force on the rotational motion. In an alternative embodiment, the hub member is mounted onto a crank axle which in turn is mounted on bearings attached to the frame member. Cranks with handles are positioned on opposite ends of the crank axle to rotate the hub in a bicycle pedalling motion.

15 Claims, 2 Drawing Sheets

FISH TAPE REEL ATTACHMENT APPARATUS USED IN COMBINATION WITH A FISH TAPE REEL

BACKGROUND OF THE INVENTION

1. Field of the Invention

The present invention generally relates to the field of wire pullers. More particularly, the present invention relates to a manually powered fish tape reel attachment apparatus used in combination with a conventional fish tape reel for pulling electrically insulated wires through a conduit.

2. Description of the Prior Art

Presently, the way electrically insulated wires are pulled through a conduit is to have a fish tape go through the conduit first and then attach it to the electrical wires and then pull the wire through by having the fish tape rotated back onto its reel through a rotating mechanism. This is a conventional fish tape retrieval system which is well known in the art.

One problem with the prior art fish tape retrieval system is that it is very difficult to pull lengthy amounts of electrical wires through the conduit using the conventional fish tape retrieval system. It is also difficult when pulling a tough kinked wire or the wire is stuck in the conduit to get any strong pressure to pull the fish tape and attached electrical wire through the conduit.

The following eight (8) prior art patents were uncovered in the pertinent field of the present invention:

1. U.S. Pat. No. 1,956,806 issued to Mitzen et al. on Jul. 17, 1933 for "Winch" (hereafter "the Mitzen Patent");

2. U.S. Pat. No. 2,099,153 issued to Walker on Jul. 17, 1936 for "Gauger's Tape Reel" (hereafter "the Walker Patent");

3. U.S. Pat. No. 2,803,413 issued to Lyon on Jul. 23, 1957 for "Reel Clamp And Handle For Magnetic Tape" (hereafter "the Lyon Patent");

4. U.S. Pat. No. 3,763,722 issued to Ehrens on Oct. 9, 1973 for "Gripping And Pulling Tool For Retracting Guide Tapes From Conduit While Pulling Electrical Wires Into The Conduit" (hereafter "the Ehrens Patent");

5. U.S. Pat. No. 3,937,415 issued to Prinz on Feb. 10, 1976 for "Downrigger" (hereafter "the Prinz Patent");

6. U.S. Pat. No. 4,251,038 issued to Gename on Feb. 17, 1981 for "Hose Reel" (hereafter "the Gename Patent");

7. U.S. Pat. No. 4,413,808 issued to Finkle on Nov. 8, 1983 for "Portable Power Driven Wire Puller" (hereafter "the Finkle Patent"); and 8. Swedish Patent No. 222,201 (hereafter "the Swedish Patent").

The Mitzen Patent discloses a winch for use in pulling wires through conduits. The Mitzen Patent illustrates a conventional reel for pulling wires through a conduit.

The Walker Patent discloses a gauger's tape reel.

The Lyon Patent discloses a reel clamp and handle for a magnetic tape.

The Ehrens Patent discloses a gripping and pulling tool for retracting guide tapes from a conduit while pulling electrical wires into the conduit. It is a hand tool, and upon pivoting action of its handles, pulls a group of electrical wires through a conduit.

The Prinz Patent discloses a downrigger. It comprises a swivelled head to be mounted anywhere on the boat for use in trolling. The line extends over a reel mounted on a pedestal, which is provided with a locking device for holding it in a desired position.

The Gename Patent discloses a hand held hose reel. It comprises a body with a hand grip portion at one end, a reel pocket in the center, and a guide assembly at the end remote from the hand grip. It utilizes a hand crank for cranking the hose onto the reel.

The Finkle Patent discloses a portable power driven wire puller. It comprises a housing with a rotatable fishing tape storage cage within the interior. The tape has engageable means on the free end that may be removably secured to a wire to draw the latter through a conduit or other elongated confined space. A flexible tubular member extends from the housing and is in communication with an extension that leads to the interior of the circular housing portion.

The Swedish Patent, as disclosed from the figures shows a pivot guide end.

None of these prior art patents have disclosed an improved manually powered fish tape reel attachment apparatus used in combination with a conventional fish tape reel and which is designed and constructed for providing additional power and capability of pulling the fish tape through a conduit. It is desirable to have a very efficient and also very effective design and construction of a manually powered fish tape reel attachment apparatus, thereby eliminating the need of additional electricians and electrician helpers, which may be required to pull the fish tape through the conduit. It is also desirable to provide an apparatus with the capability to orient the direction of the fish tape in the appropriate oriented direction and then hold the device in one hand and rotate it with the strong ratchet motion in the other hand so that substantial additional force can be applied to pull the fish tape through the conduit and to pull it through bends and areas where it may be difficult to pull the electrical wire through the conduit.

SUMMARY OF THE INVENTION

The present invention is a manually powered fish tape reel attachment apparatus used in combination with a conventional fish tape reel for pulling a group of electrically insulted wires through a conduit.

The apparatus comprises a frame member which has a fixed handle at one end and a tubular member at the other end. The fixed handle is similar to the handle of a saw so that the hand of a user can be put through a portion of the handle and held steady. The tubular member comprises a hollow exterior pipe which is affixed to the frame member remote from the handle and within it, a hollow interior pipe that can be rotated to any orientation. The exterior pipe has an orientation which is terminated at a 45° angle. An internal hub is mounted in the middle of the frame member such that a conventional fish tape reel can be fitted over it and rotated by the internal hub. The fish tape itself is fed through the tubular member.

The interior pipe is rotatably press-fitted within the exterior pipe, thereby allowing the interior pipe to be rotated to any orientation so that if the electrical wire is being pulled from above, the interior pipe can be rotated so that the 45° angle points upward. If the electrical wire is being pulled from the side, the interior pipe can be rotated so that the 45° angle points to the side. If the electrical wire is being pulled from below, the interior pipe can be rotated so that the angle is being pulled from below.

In the middle of the frame member is a ratchet mechanism which in fact is a ratchet type device that is attached to a gear mechanism which is attached to the internal hub. The ratchet mechanism can be rotated and due to the ratcheting effect of the ratchet mechanism, can create excess pressure and force on the rotational motion.

It is therefore an object of the present invention to provide a tubular member which comprises a hollow interior pipe rotatably press-fitted within a hollow exterior pipe. The tubular member is affixed at one end to a fish tape reel attachment apparatus at a 45° angle, so that the interior pipe can therefore be rotated to any orientation for providing assistance to make it much easier to pull a group of electrical wires through a very lengthy conduit and through conduits that have many bends where the pulling motion would be far more difficult.

It is also an object of the present invention to provide a manually powered fish tape reel attachment apparatus which comprises a ratchet mechanism which is a ratchet type device attached to a gear mechanism which is attached to an internal hub, so that the ratchet mechanism can be rotated and due to the ratcheting effect of the ratchet mechanism, can create excess pressure and force on the rotational motion of the fish tape reel. The fish tape is fed through one end of the tubular member and then from there, in through the conduit where it is contacted at the other end by the electrical wire to be pulled through the conduit. Now instead of merely holding the reel in one hand and rotating it which gives little pressure, the present invention apparatus enables the user to orient the direction of the fish tape in the appropriate oriented direction and then hold the apparatus in one hand and rotate it with the strong ratchet motion in the other hand so that substantial additional force can be applied to pull the electrical wire through the conduit and to pull it through bends and areas where it may be difficult to pull the electrical wire through the conduit. The rotation motion of the ratchet mechanism basically enables far more force to be applied.

It is a further object of the present invention to provide a ratchet mechanism which is capable of being removed from a specific ratchet location and placed into another ratchet location so that different gear mechanisms can be changed to orient the amount of force and ratcheting effect being utilized on the fish tape.

It is an additional object of the present invention to provide a manually powered fish tape reel attachment apparatus which comprises several different gear mechanisms for providing a first gear, a second gear and any other plurality of gears to have different strengths of pulling motion applied.

It is a further object of the present invention to provide a manually powered fish tape reel attachment apparatus utilizing a rotating mechanism which is similar to a bicycle pedalling system, so that substantial additional force can be applied to pull the electrical wire through the conduit and to pull it through bends and areas where it may be difficult to pull the electrical wire through the conduit.

In the preferred embodiment of the present invention, the manually powered fish tape reel attachment utilizes a ratchet mechanism which is a ratchet type device attached to a gear mechanism which is attached to the internal hub. The ratchet mechanism can be rotated and due to the ratcheting effect of the ratchet mechanism, can create excess pressure and force on the rotational motion.

In an alternative embodiment of the present invention, the manually powered fish tape reel attachment apparatus utilizes a rotating mechanism which is similar to a bicycle pedalling system, so that substantial additional force can be applied to pull the electrical wire through the conduit and to pull it through bends and areas where it may be difficult to pull the electrical wire through the conduit.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
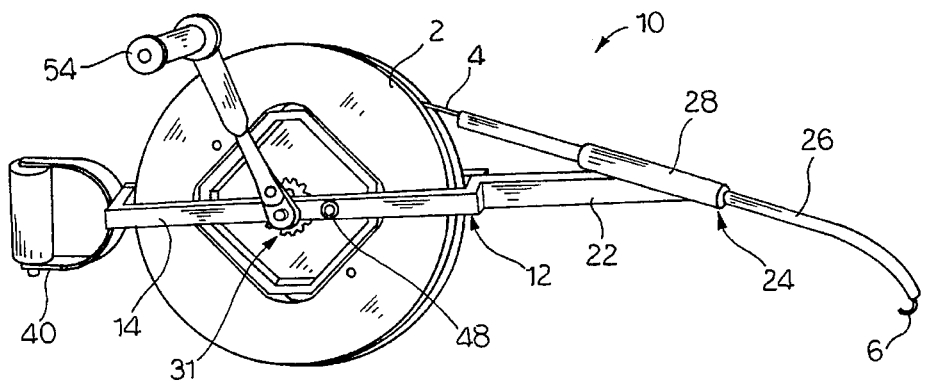
FIG. 1 is a perspective view of the preferred embodiment of the present invention manually powered fish tape reel attachment apparatus used in combination with a conventional fish tape reel.

Referring to FIG. 1, there is shown at 10 a perspective view of the preferred embodiment of the present invention manually powered fish tape reel attachment apparatus used in combination with a conventional fish tape reel 2. The fish tape reel 2 comprises an elongated stiff, resilient fishing tape 4 wound smoothly around the fish tape reel 2. The fish tape 4 has engageable means 6 at one end thereof to which a length of electrically insulated wire may be secured to be pulled through a conduit or other elongated confined space. The manually powered fish tape reel attachment apparatus 10 can be used with the fish tape reel that utilizes fish tape made of metal, fiberglass, or any non-electrically conducting material. Specifically, the present invention manually powered fish tape reel attachment 10 is used for winding the fish tape back onto the fish tape reel.

Figure 2:
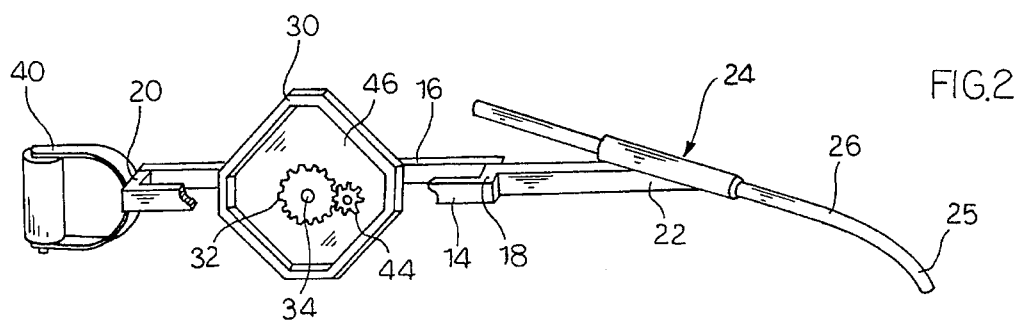
FIG. 2 is a partial cutout perspective view of the right side of the present invention manually powered fish tape reel attachment apparatus, showing the gear wheels intermeshed together.
Figure 4:
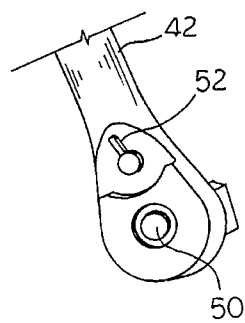
FIG. 4 is a partial perspective view of the ratchet mechanism, showing the quick release button and the reversible lever.
Figure 3:
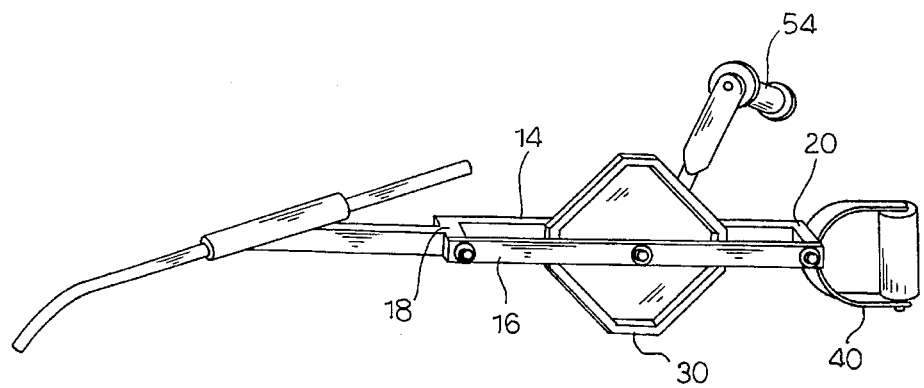
FIG. 3 is a perspective view of the left side of the present invention manually powered fish tape reel attachment apparatus, showing a longitudinal elongated removably detachable bar.

FIG. 2 illustrates a perspective view of the fish tape reel attachment apparatus 10 without the fish tape reel 2 shown in FIG. 1. FIG. 3 illustrates the other side of the fish tape reel attachment apparatus 10. Referring to FIGS. 1, 2 and 3, the apparatus 10 comprises a frame member 12, a tubular member 24, an internal hub member 30, a gear mechanism 31, and a handle member 40. The frame member 12 is generally a rectangular shape and comprises a pair of opposite longitudinal elongated parallel bars 14 and 16, and a pair of opposite transverse parallel bars 18 and 20. The pair of opposite transverse parallel bars 18 and 20 are integrally connected at their ends to the longitudinal elongated parallel bar 14 to form one side of the frame member 12. The longitudinal elongated parallel bar 16 is removably attachable to the other ends of the pair of transverse parallel bars 18 and 20 to form the other side of the frame member 12 and provide a space therebetween for receiving the fish tape reel 2, as shown in FIG. 1.

An elongated protruding shaft support 22 is integrally connected to the transverse parallel bar 18 and extends in a longitudinal direction and parallel to the frame member 12. The protruding shaft support 22 is utilized to support the tubular member 24. The tubular member 24 comprises an elongated hollow cylindrical shaped interior pipe or tube 26 and a hollow cylindrical shaped exterior pipe or tube 28. The internal diameter of the exterior pipe 28 is slightly larger than the external diameter of the interior pipe 26 such that the interior pipe 26 is rotatably press-fitted within the exterior pipe 28. The end of the fishing tape 4 is inserted through one end of the interior pipe 26 and out the other end, as shown in FIG. 1 for attaching to the length of wire. The middle of the exterior pipe 28 is attached to the protruding shaft support 22 and terminates at an angle of approximately 45°, thereby allowing the interior pipe 26, which in turn has a bent end 25 as shown, to be rotated to any orientation so that if the electrical wire is being pulled from above, the interior pipe 26 can be rotated so that the 45° angle points upward. If the electrical wire is being pulled from the side, the interior pipe 26 can be rotated so that the 45° angle points to the side. If the electrical wire is being pulled from below, the interior pipe 26 can be rotated so that the angle is being pulled from below.

Figure 5:
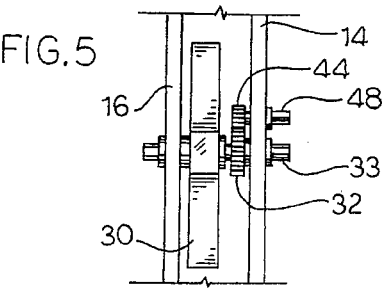
FIG. 5 is a partial top elevational view of the gear wheels.

Referring to FIGS. 2 and 5, the internal hub member 30 is generally an octagonal shape and is mounted between the pair of longitudinal parallel bars 14 and 16 such that the fish tape reel 2 can be fitted onto the hub 30. The gear mechanism 31 is mounted within the frame member 12. It comprises a large gear wheel 32 meshed with a small gear wheel 44. Each gear wheel has a toothed rim mounted on a shaft. The gear wheels 32 and 44 transmit rotary motion from one shaft to another through meshing perimetral teeth on wheels mounted on the shafts. The rotation speeds of the shafts are inversely proportional to the respective gear diameters (inversely proportional to the numbers of gear teeth). The shafts of the gear wheels rotate in opposite directions which in turn rotate the gear wheels in opposite directions.

The internal hub member 30 is held in position and interconnects with the first shaft 34 which extends through the center of the internal hub member 30 and is rotatably connected to the pair of longitudinal parallel bars 14 and 16. The first shaft 34 has connection means 33 at one end that is similar to a socket connection, in which a ratchet wrench or mechanism 42 can be connected thereon for rotating the internal hub member 30 at a higher torque. The large gear wheel 32 is rigidly mounted on the first shaft 34 and located adjacent to the internal hub member 30. The first shaft 34 can be rotated by the ratchet wrench 42 and due to the ratcheting effect of the ratchet wrench 42, can create excess pressure and force on the rotational motion. When the first shaft 34 is rotated by the ratchet wrench 42, the large gear wheel 32 will also be rotating in the direction of the axis of rotation.

The second shaft 46 is rotatably connected to the longitudinal parallel bar 14 such that the teeth of the small gear wheel 44 engage with the teeth of the large gear wheel 32. The second shaft 46 has connection means 48 at one end that is similar to a socket connection, in which the ratchet wrench 42 can also be connected thereon for rotating the internal hub member 30. The large gear wheel 32 rotates more slowly, but transmits the higher torque. The small gear wheel 44 rotates at a higher speed than the large gear wheel 32 but the torque is lower. The ratio of the large gear wheel 32 to the small gear wheel 44 is 3:1.

The ratchet wrench 42 can be connected to either the small gear wheel 44 or the large gear wheel 32 for rotating the internal hub member 30 which in turn rotates the fish tape reel, depending on the situation. The ratchet wrench 42 further comprises a transverse handle 54 for grasping thereon and a release button 50 which is a positive lock and quick release for releasing the ratchet wrench 42 from the connection means 33 or 48 of the large or small gear wheels 32 and 44 respectively. The ratchet wrench 42 also has a reversible lever 52 for changing the direction when the ratchet wrench 42 is positioned to a different gear wheel because of the gear wheels are rotating in different direction. For example, the lever is set in one direction for rotation when attached to the large gear 32. When attached to the small gear 44, it is set in the reverse direction so that the net direction of pull to rewind the fish tape 4 is the same.

The handle member 40 is attached to the transverse parallel bar 20. The handle member 40 is similar to the handle of a saw so that the hand of a user can be put through a portion of the handle member 40 and held steady.

The present invention conforms to conventional forms of manufacture, and is of simple construction and is easy to use. The fish tape reel attachment apparatus 10 can be made from several materials. By way of example, the fish tape reel attachment 10 can be made of metal material or any other suitable material.

The operation of the foregoing embodiment now will be described. The apparatus 10 is used in combination with a conventional fish tape reel. The ratchet wrench 42 is either connected to one of the connection means 33 or 48 of the large or small gear wheels 32 and 44 respectively. The ratchet wrench 42 is then rotated such that it rotates the shaft which in turn rotates the internal hub member 30 which in turn rotates the fish tape reel. It enables a user to orient the direction of the fishing tape in the appropriate oriented direction and then hold the apparatus 10 in one hand and rotate it with the ratchet motion in the other hand so that substantial additional force can be applied to pull the length of wire through the conduit and to pull it through bends and areas where it may be difficult to pull the length of wire through the conduit, thereby enabling the rotation of the ratchet wrench 42 with far more force being applied.

The alternative embodiment of the present invention is very similar to the preferred embodiment just discussed and the only difference is the nature and configuration of the rotating mechanism which is similar to a bicycle pedalling system 141. All of the parts of the alternative embodiment fish tape reel attachment apparatus 110 are numbered correspondingly with 100 added to each number.

Figure 6:
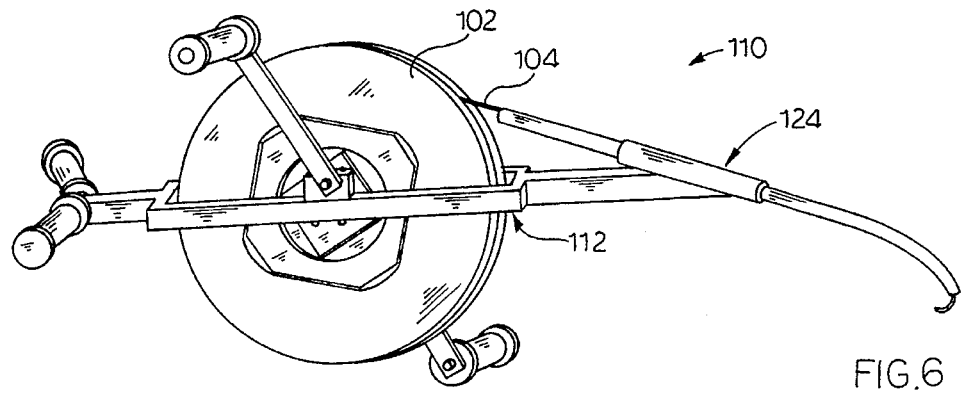
FIG. 6 is a perspective view of an alternative embodiment of the present invention manually powered fish tape reel attachment apparatus used in combination with a conventional fish tape reel.

Referring to FIG. 6, there is shown at 110 a perspective view of the present invention manually powered fish tape reel attachment apparatus used in combination with a conventional fish tape reel 102.

Figure 7:
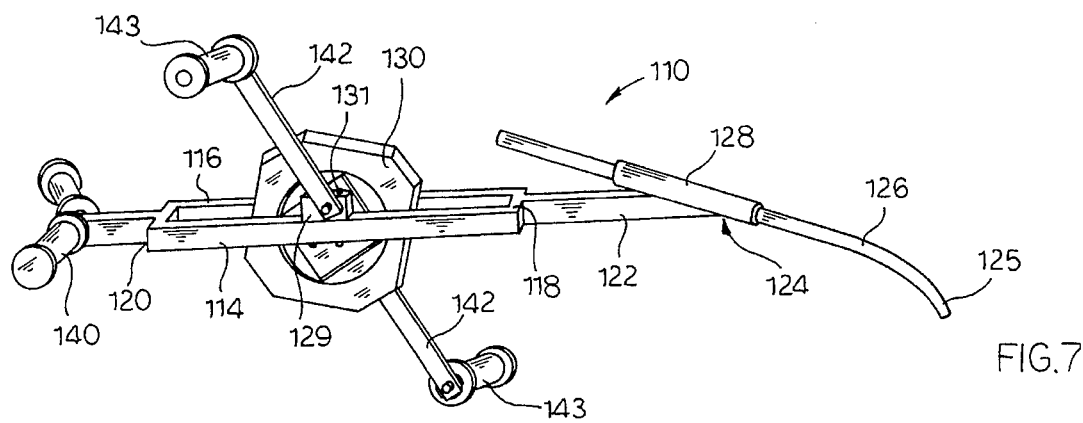
FIG. 7 is a perspective view of the right side of the alternative embodiment of the present invention manually powered fish tape reel attachment apparatus without the conventional fish tape reel.
Figure 8:
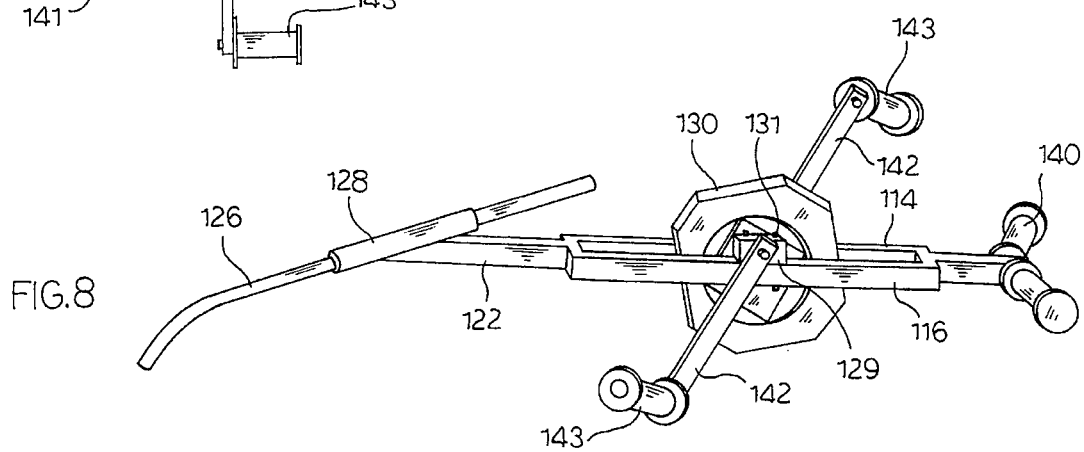
FIG. 8 is a perspective view of the left side of the alternative embodiment of the present invention manually powered fish tape reel attachment apparatus.

Referring to FIGS. 6, 7 and 8, the apparatus 110 comprises a frame member 112, a tubular member 124, an internal hub member 130, and a handle member 140. The frame member 112 is generally a rectangular shape and comprises a pair of opposite transverse parallel bars 118 and 120 integrally connected at their ends to a pair of opposite longitudinal elongated parallel bars 114 and 116 and form a space therebetween for receiving the fish tape reel 102, as shown in FIG. 6.

An elongated protruding shaft support 122 is integrally connected to the transverse parallel bar 118 and extends in a longitudinal direction and parallel to the frame member 112. The protruding shaft support 122 is utilized to support the tubular member 124. The tubular member 124 comprises an elongated hollow cylindrical shaped interior pipe or tube 126 and a hollow cylindrical shaped exterior pipe or tube 128. The internal diameter of the exterior pipe 128 is slightly larger than the external diameter of the interior pipe 126 such that the interior pipe 126 is rotatably press-fitted within the exterior pipe 128. The end of the fish tape 104 is inserted through one end of the interior pipe 126 and out the other end, as shown in FIG. 6 for attaching to the length of wire. The middle of the exterior pipe 128 is attached to the protruding shaft support 122 at an angle of approximately 45°, thereby allowing the interior pipe 126 to be rotated to any orientation. The interior pipe 126 has a bent front end 125 as illustrated to permit orientation of the pipe 126 in any appropriate direction.

Figure 9:
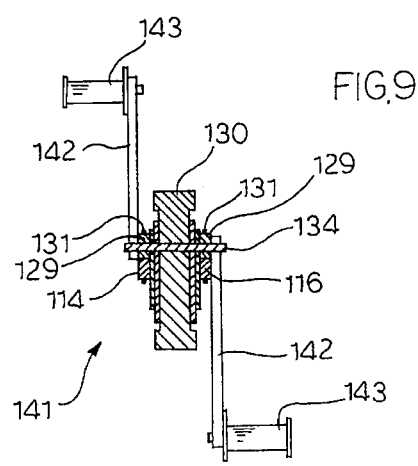
FIG. 9 is a partial cross-sectional view of the cranks.

Referring to FIGS. 7, 8 and 9, the internal hub member 130 is generally an octagonal shape and is mounted between the pair of longitudinal parallel bars 114 and 116 such that the fish tape reel 102 can be fitted onto the hub 130. A pair of opposite square shaped bearings 129 are respectively mounted above the pair of longitudinal bars 114 and 116 by bolts 131 and located adjacent to the middle of the internal hub member 130. The hub member 130 is mounted onto a crank axle 134 such that the hub member is positioned between said pair of longitudinal parallel bars 114 and 116, and between said pair of bearings 129 such that the crank axle 134 is mounted on said bearings 129 for allowing the hub member 130 to rotate. Cranks 142 are mounted onto opposite ends of said crank axle 134. Once the crank axle 134 is secured between the bearings 129, the cranks 142 can be rotated by means of crank handles 143 on both sides of the frame member 112. The fish tape reel 102 can be installed within the frame member 112 by removing the bolts 131 from the pair of bearings 129. The internal hub member 130 is lifted away the frame member 112, and thereby the fish tape reel 102 is guided through one of the cranks 142 and onto the hub member 130. The internal hub member 130 is installed back within the frame member 112, where the bolts 131 are then tighten back onto the bearings 129 and onto the frame member 112.

The handle member 140 is attached to the transverse parallel bar 120. The handle member 140 is utilized by pressing against the individual's chest or anywhere that is suitable for the handle member 140 to be pressed against so that the crank handles 143 can be rotated to rotate the internal hub member 130 which in turn rotates the fish tape reel.

The operation of the foregoing embodiment now will be described. The apparatus 110 is used in combination with a conventional fish tape reel. The cranks 142 can be rotated by the crank handles 143 such that it rotates the crank axle 134 which in turn rotates the internal hub member 130 which in turn rotates the fish tape reel. The rotational motion is similar to pedalling a bicycle, in which the hands of the user perform the pedalling motion. It enables a user to orient the direction of the fishing tape in the appropriate oriented direction so that substantial additional force can be applied to pull the length of wire through the conduit and to pull it through bends and areas where it may be difficult to pull the length of wire through the conduit.

Defined in detail, the present invention is a fish tape reel attachment apparatus used in combination with a fish tape reel which has an elongated stiff, resilient tape wound on the reel and having means on one end thereof to which a length of wire may be secured to be pulled through a conduit, the apparatus comprising: (a) a generally rectangular shaped frame member having a pair of opposite transverse parallel bars connected at their ends to a pair of opposite longitudinally elongated parallel bars and forming a space therebetween, one of the pair of opposite longitudinally parallel bar being removably detachable for installing said fish tape reel within the space of the frame member; (b) an internal hub member mounted between said pair of longitudinally parallel bars such that said fish tape reel is fitted onto the internal hub member; (c) a gear mechanism including a large gear wheel meshed with a small gear wheel, the large gear wheel mounted on a first shaft which in turn interconnects, and is located adjacent, to said internal hub member for rotating said internal hub member at a higher torque, the first shaft mounted between said pair of longitudinally parallel bars and having first connection means, the small gear wheel mounted on a second shaft which in turn is mounted to the other one of said pair of longitudinally parallel bars for rotating said large gear wheel which in turn rotates said internal hub member at a lower torque, the small gear wheel having second connection means; (d) a ratchet mechanism for connecting to said first connection means or said second connection means to rotate said large gear wheel or said small gear wheel which in turn rotates said internal hub member, which in turn rotates said fish tape reel, the ratchet mechanism having a handle for grasping thereon; (e) an elongated protruding shaft support attached to one of said pair of transverse parallel bars and extending in a longitudinal direction and parallel to said pair of longitudinally parallel bars; (f) a hollow cylindrical shaped exterior pipe attached to said protruding shaft support at an angle; (g) an elongated hollow cylindrical shaped interior pipe having a bent front end rotatably press-fitted within said hollow exterior pipe, where said tape is inserted through the hollow interior pipe and extends out the bent front end for attaching to the length of wire; and (h) a handle member affixed to the other one of said pair of transverse parallel bars for holding said fish tape reel attachment apparatus; (i) whereby said apparatus enables a user to orient the direction of said tape of said fish tape reel in the appropriate oriented direction and then hold said apparatus in one hand and rotate it with the ratchet motion in the other hand so that substantial additional force can be applied to pull the length of wire through the conduit and to pull it through bends and areas where it may be difficult to pull the length of wire through the conduit, thereby enabling the rotation of said ratchet mechanism to provide far more force to be applied.

Defined broadly, the present invention is a tape reel attachment apparatus used in combination with a fish tape reel which has an elongated stiff, resilient tape wound on the reel for pulling a length of wire through a conduit, the apparatus comprising: (a) a frame member having a multiplicity of bars connected at their ends and forming a space therebetween, a respective one of the bars being removably detachable such that said fish tape reel can be installed within the space of the frame member; (b) a hub member mounted between a respective two of said multiplicity of bars such that said fish tape reel is fitted onto the hub member; (c) a gear mechanism including a first gear wheel meshed with a second gear wheel, the first gear wheel mounted on a first shaft which in turn interconnects, and is located adjacent, to said hub member for rotating said internal hub member, the first shaft mounted between said respective two of said multiplicity of bars and having first connection means, the second gear wheel mounted on a second shaft which in turn is mounted to said respective one of said multiplicity of bars opposite to said removably detachable bar for rotating said first gear wheel which in turn rotates said hub member and having second connection means; (d) a ratchet mechanism for connecting to said first connection means or said second connection means to rotate said first gear wheel or said second gear wheel which in turn rotates said hub member, which in turn rotates said fish tape reel; (e) a shaft support attached to a respective one of said multiplicity of bars; (f) an exterior tube attached to said shaft support; (g) an interior tube rotatably press-fitted within said exterior tube, where said tape is inserted through the interior tube for attaching to the length of wire; and (h) means for holding said tape reel attachment apparatus; (i) whereby said apparatus enables a user to orient the direction of said tape of said fish tape reel in the appropriate oriented direction and then hold said apparatus in one hand and rotate it with the ratchet motion in the other hand so that substantial additional force can be applied to pull the length of wire through the conduit and to pull it through bends and areas where it may be difficult to pull the length of wire through the conduit, thereby enabling the rotation of said ratchet mechanism to provide far more force to be applied.

Defined more broadly, the present invention is a reel attachment apparatus used in combination with a tape reel which has a tape wound on the reel for pulling a length of wire through a conduit, the apparatus comprising: (a) a frame member having at least one side being removably detachable for installing said tape reel; (b) a hub member mounted within said frame member such that said tape reel is fitted onto the hub member; (c) first gear means mounted on a first shaft which in turn interconnects with said hub member, the first shaft mounted within said frame member for rotating said hub member; (d) second gear means engaged with said first gear means for rotating said first gear means which in turn rotates said hub member; (e) means for rotating said first or second gear means which in turn rotates said hub member, which in turn rotates said tape reel; and (f) means for guiding said tape of said tape reel to wind back onto said tape reel; (g) whereby said apparatus enables a user to orient the direction of said tape of said tape reel in the appropriate oriented direction so that substantial additional force can be applied to pull the length of wire through the conduit and to pull it through bends and areas where it may be difficult to pull the length of wire through the conduit.

Defined alternatively in detail, the present invention is a tape reel attachment apparatus used in combination with a fish tape reel which has an elongated stiff, resilient tape wound on the reel for pulling a length of wire through a conduit, the apparatus comprising: (a) a frame member having a pair of opposite transverse bars integrally connected at their ends to a pair of opposite longitudinally parallel bars and forming a space therebetween for installing said fish tape reel within the space of the frame member; (b) a pair of bearings with a respective bearing mounted to a respective one of said pair of opposite longitudinally parallel bars; (c) a hub member mounted onto a crank axle and positioned between said pair of longitudinally parallel bars and between said pair of bearings such that the crank axle is mounted on said bearings; (d) said fish tape reel mounted onto said hub member; (e) two crank members with a respective crank member securely attached to opposite ends of said crank axle for rotating said hub member, which in turn rotates said fish tape reel to wind said tape; (f) a shaft support attached to one of said pair of transverse parallel bars and extending in a longitudinal direction and parallel to said pair of longitudinal parallel bars; (g) a hollow exterior pipe attached to said shaft support; and (h) a hollow interior pipe rotatably press-fitted within said hollow exterior pipe, where said tape is inserted through the interior pipe for attaching to the length of wire; (i) whereby said apparatus enables a user to orient the direction of said tape of said fish tape reel in the appropriate oriented direction and then hold said apparatus, thereby rotating said crank members with additional force applied to pull the length of wire through the conduit and to pull it through bends and areas where it may be difficult to pull the length of wire through the conduit.

Defined alternatively broadly, the present invention is a tape reel attachment apparatus used in combination with a fish tape reel which has an elongated stiff, resilient tape wound on the reel for pulling a length of wire through a conduit, the apparatus comprising: (a) a frame member having a pair of opposite transverse bars integrally connected at their ends to a pair of opposite longitudinally parallel bars and forming a space therebetween for installing said fish tape reel within the space of the frame member; (b) a pair of bearings with a respective bearing mounted to said pair of opposite longitudinally parallel bars; (c) a hub member mounted onto a crank axle and positioned between said pair of longitudinally parallel bars and between said pair of bearings such that the crank axle is mounted on said bearings; (d) said fish tape reel mounted onto said hub member; (e) two crank members with a respective crank member securely attached to opposite ends of said crank axle for rotating said hub member, which in turn rotates said fish tape reel to wind said tape; (f) a shaft support attached to one of said pair of transverse parallel bars and extending in a longitudinal direction and parallel to said pair of longitudinal parallel bars; (g) a hollow exterior pipe attached to said shaft support; and (h) a hollow interior pipe rotatably press-fitted within said hollow exterior pipe, where said tape is inserted through the interior pipe for attaching to the length of wire; (i) whereby said apparatus enables a user to orient the direction of said tape of said fish tape reel in the appropriate oriented direction and then hold said apparatus, thereby rotating said crank members with additional force applied to pull the length of wire through the conduit and to pull it through bends and areas where it may be difficult to pull the length of wire through the conduit.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modifications in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A fish tape reel attachment apparatus used in combination with a fish tape reel which has an elongated stiff, resilient tape wound on the reel and having means on one end thereof to which a length of wire may be secured to be pulled through a conduit, the apparatus comprising:

a. a generally rectangular shaped frame member having a pair of opposite transverse parallel bars connected at their ends to a pair of opposite longitudinally elongated parallel bars and forming a space therebetween, one of the pair of opposite longitudinally parallel bars being removably detachable for installing said fish tape reel within the space of the frame member;

b. an internal hub member mounted between said pair of longitudinally parallel bars such that said fish tape reel is fitted onto the internal hub member;

c. a gear mechanism including a large gear wheel meshed with a small gear wheel, the large gear wheel mounted on a first shaft which in turn interconnects, and is located adjacent, to said internal hub member for rotating said internal hub member at a higher torque, the first shaft mounted between said pair of longitudinally parallel bars and having first connection means, the small gear wheel mounted on a second shaft which in turn is mounted to the other one of said pair of longitudinally parallel bars for rotating said large gear wheel which in turn rotates said internal hub member at a lower torque, the small gear wheel having second connection means;

d. a ratchet mechanism for connecting to said first connection means or said second connection means to rotate said large gear wheel or said small gear wheel which in turn rotates said internal hub member, which in turn rotates said fish tape reel, the ratchet mechanism having a handle for grasping thereon;

e. an elongated protruding shaft support attached to one of said pair of transverse parallel bars and extending in a longitudinal direction and parallel to said pair of longitudinally parallel bars;

f. a hollow cylindrical shaped exterior pipe attached to said protruding shaft support at an angle;

g. an elongated hollow cylindrical shaped interior pipe having a bent front end rotatably press-fitted within said hollow exterior pipe, where said tape is inserted through the hollow interior pipe and extends out the bent front end for attaching to the length of wire; and h. a handle member affixed to the other one of said pair of transverse parallel bars for holding said fish tape reel attachment apparatus;

i. whereby said apparatus enables a user to orient the direction of said tape of said fish tape reel in the appropriate oriented direction and then hold said apparatus in one hand and rotate it with the ratchet motion in the other hand so that substantial additional force can be applied to pull the length of wire through the conduit and to pull it through bends and areas where it may be difficult to pull the length of wire through the conduit, thereby enabling the rotation of said ratchet mechanism to provide far more force to be applied.

2. The apparatus in accordance with claim 1 wherein said ratchet mechanism further comprises a positive lock for preventing said ratchet mechanism from being loosened.

3. The apparatus in accordance with claim 1 wherein said ratchet mechanism further comprises a quick release button for releasing said ratchet mechanism from said first or second connection means.

4. The apparatus in accordance with claim 1 wherein said ratchet mechanism further comprises a reversible lever for changing the direction of rotation of said ratchet mechanism for use with said gear wheels which in turn rotates said internal hub member which in turn rotates said fish tape reel.

5. The apparatus in accordance with claim 1 wherein said gear wheels have two speeds with a 3:1 ratio.

6. A tape reel attachment apparatus used in combination with a fish tape reel which has an elongated stiff, resilient tape wound on the reel for pulling a length of wire through a conduit, the apparatus comprising:

a. a frame member having a multiplicity of bars connected at their ends and forming a space therebetween, a respective one of the bars being removably detachable such that said fish tape reel can be installed within the space of the frame member;

b. a hub member mounted between a respective two of said multiplicity of bars such that said fish tape reel is fitted onto the hub member;

c. a gear mechanism including a first gear wheel meshed with a second gear wheel, the first gear wheel mounted on a first shaft which in turn interconnects, and is located adjacent, to said hub member for rotating said internal hub member, the first shaft mounted between said respective two of said multiplicity of bars and having first connection means, the second gear wheel mounted on a second shaft which in turn is mounted to said respective one of said multiplicity of bars opposite to said removably detachable bar for rotating said first gear wheel which in turn rotates said hub member and having second connection means;

d. a ratchet mechanism for connecting to said first connection means or said second connection means to rotate said first gear wheel or said second gear wheel which in turn rotates said hub member, which in turn rotates said fish tape reel;

e. a shaft support attached to a respective one of said multiplicity of bars;

f. an exterior tube attached to said shaft support;

g. an interior tube rotatably press-fitted within said exterior tube, where said tape is inserted through the interior tube for attaching to the length of wire; and h. means for holding said tape reel attachment apparatus;

i. whereby said apparatus enables a user to orient the direction of said tape of said fish tape reel in the appropriate oriented direction and then hold said apparatus in one hand and rotate it with the ratchet motion in the other hand so that substantial additional force can be applied to pull the length of wire through the conduit and to pull it through bends and areas where it may be difficult to pull the length of wire through the conduit, thereby enabling the rotation of said ratchet mechanism to provide far more force to be applied.

7. The apparatus in accordance with claim 6 wherein said ratchet mechanism further comprises a positive lock for preventing said ratchet mechanism from being loosened.

8. The apparatus in accordance with claim 6 wherein said ratchet mechanism further comprises a quick release button for releasing said ratchet mechanism from said first connection means or said second connection means.

9. The apparatus in accordance with claim 6 wherein said ratchet mechanism further comprises a reversible lever for changing the direction of rotation of said ratchet mechanism so that the direction of rotation is in one direction when said ratchet mechanism is attached to said first connection means and the direction of rotation is in the opposite direction when said ratchet mechanism is attached to said second attachment means.

10. The apparatus in accordance with claim 6 wherein said exterior tube is mounted at angle of approximately 45° and said interior tube has a bent front end.

11. The apparatus in accordance with claim 6 wherein said gear wheels have two speeds with a 3:1 ratio.

12. The apparatus in accordance with claim 6 wherein said means for holding said tape reel attachment apparatus comprises a handle attached to a respective one of said multiplicity of bars.

13. A tape reel attachment apparatus used in combination with a fish tape reel which has an elongated stiff, resilient tape wound on the reel for pulling a length of wire through a conduit, the apparatus comprising:

a. a frame member having a pair of opposite transverse bars integrally connected at their ends to a pair of opposite longitudinally parallel bars and forming a space therebetween for installing said fish tape reel within the space of the frame member;

b. a pair of bearings with a respective bearing mounted to a respective one of said pair of opposite longitudinally parallel bars;

c. a hub member mounted onto a crank axle and positioned between said pair of longitudinally parallel bars and between said pair of bearings such that the crank axle is mounted on said bearings;

d. said fish tape reel mounted onto said hub member;

e. two crank members with a respective crank member securely attached to opposite ends of said crank axle for rotating said hub member, which in turn rotates said fish tape reel to wind said tape;

f. a shaft support attached to one of said pair of transverse parallel bars and extending in a longitudinal direction and parallel to said pair of longitudinal parallel bars;

g. a hollow exterior pipe attached to said shaft support; and h. a hollow interior pipe rotatably press-fitted within said hollow exterior pipe, where said tape is inserted through the interior pipe for attaching to the length of wire;

i. whereby said apparatus enables a user to orient the direction of said tape of said fish tape reel in the appropriate oriented direction and then hold said apparatus, thereby rotating said crank members with additional force applied to pull the length of wire through the conduit and to pull it through bends and areas where it may be difficult to pull the length of wire through the conduit.

14. The apparatus in accordance with claim 13 further comprising a handle attached to the other one of said pair of transverse parallel bars for holding said fish tape reel attachment apparatus.

15. The apparatus in accordance with claim 13 wherein said hollow exterior pipe is mounted at angle of approximately 45° and said interior hollow pipe has a bent front end.

* * * * *